United States Patent
Journee

[11] Patent Number: 5,325,562
[45] Date of Patent: Jul. 5, 1994

[54] SCREEN WIPER INCLUDING MEANS FOR ADJUSTING THE WIPING TORQUE

[75] Inventor: Maurice Journee, Reilly, France

[73] Assignee: Paul Journee, S.A., Colombes, France

[21] Appl. No.: 74,789

[22] Filed: Jun. 10, 1993

[30] Foreign Application Priority Data

Jun. 10, 1992 [FR] France .................. 92 06982

[51] Int. Cl.5 .................. B60S 1/32
[52] U.S. Cl. .................. 15/250.2; 15/250.35
[58] Field of Search ............ 15/250.2, 250.35, 250.34, 15/250.19, 250.31

[56] References Cited

U.S. PATENT DOCUMENTS

| | | | |
|---|---|---|---|
| 2,619,668 | 12/1952 | Sivacek | 15/250.35 |
| 4,791,697 | 12/1988 | Fry | 15/250.2 |
| 5,056,182 | 10/1991 | Fukumoto et al. | 15/250.2 |
| 5,222,274 | 6/1993 | Schon | 15/250.35 |

FOREIGN PATENT DOCUMENTS

| | | | |
|---|---|---|---|
| 0412804 | 2/1991 | European Pat. Off. | |
| 4032762 | 8/1991 | Fed. Rep. of Germany | |
| 93653 | 6/1983 | Japan | 15/250.2 |
| 14159 | 1/1986 | Japan | 15/250.2 |

Primary Examiner—Philip R. Coe
Assistant Examiner—Gary K. Graham
Attorney, Agent, or Firm—Morgan & Finnegan

[57] ABSTRACT

A screen wiper for a motor vehicle windshield comprises a screen wiper arm which is articulated about an articulation axis (X—X) on a drive head for driving the wiper arm. The wiper includes a cam connected to the drive head and a cam follower element which is connected to the screen wiper arm and which is displaced along the cam profile as a function of the relative angular displacements between the wiper arm and the drive head about the articulation axis (X—X), so as to apply to the arm a complementary torque such as to cause the value of the wiping torque to vary.

8 Claims, 3 Drawing Sheets

SCREEN WIPER INCLUDING MEANS FOR ADJUSTING THE WIPING TORQUE

FIELD OF THE INVENTION

The present invention relates to a screen wiper, especially for a motor vehicle. The term "screen wiper" is to be understood to mean a wiper suitable to sweep a glass surface such as that of the windshield of a vehicle.

More particularly, the invention is concerned with a screen wiper of the type which comprises a screen wiper arm carrying at least one wiper blade, the wiper arm being articulated about an articulation axis on a drive head of the wiper, the drive head being put into the conventional alternating rotational or oscillating motion by a wiper spindle, so as to sweep the surface of the glass associated therewith (this surface being referred to in this specification as the swept surface). In the usual way, the screen wiper arm carries, through a blade carrier, a wiper blade which is articulated on it and which is adapted to wipe over the swept surface (for example a motor vehicle windshield), with the blade following the curved form of the swept surface.

BACKGROUND OF THE INVENTION

In order to obtain correct wiping of the swept surface, it is necessary that the wiping strip of the wiper blade should be applied on the swept surface with a substantial pressing or wiping force. To this end at least one spring is usually provided, for example a helical tension spring which is disposed between the drive head and the remainder of the wiper arm, and which applies to the wiper arm a wiping torque the nominal value of which is substantially constant, so as to urge the wiper blade strip against the swept surface.

With this design of wiper, the wiping strip is in contact with the swept surface not only during the actual wiping movement, but also when the wiper is in its rest or parked position. Due to the fact that the nominal value of the wiping force which is applied to the wiping strip when the wiper is at rest is constant, it is found that the wiping strip retains a residual deformation resulting from the flexing of its profile against the swept surface, so that the wiping effect obtained from the wiping strip is not effective enough. It is therefore desirable to be able to reduce the value of the wiping force which is applied to the wiping strip when the wiper itself is at rest.

In addition, the quality of the wiping of the swept surface depends in operation on proper control of the wiping force which is applied to the wiping strip, especially having regard to the travelling speed of the vehicle, the frequency of the wiping movement of the wiper itself, and the position of the wiping strip on the windshield.

In this connection, and having regard to the curvature of the swept surface, the wiping strip is not applied with a substantially constant wiping force over its whole length in the various positions which it occupies during one wiping cycle. It is therefore desirable to be able to guarantee that the wiping strip is applied with a sufficiently large wiping force against the swept surface in all its various positions during the wiping operation.

Finally, in the course of one wiping cycle, it is also desirable to be able to reduce the wiping force at the two extreme positions occupied by the wiper during the cycle, in order, especially, to facilitate reversal of its motion.

DISCUSSION OF THE INVENTION

In order to resolve the various problems discussed above, the invention proposes a screen wiper, especially for a motor vehicle, of the type including a screen wiper arm which carries at least one wiper blade and which is articulated on a drive head about an articulation axis, and torque applying means arranged to act between the drive head and the screen wiper arm so as to apply a wiping torque to the latter, the torque applying means including at least one spring which applies to the screen wiper arm a wiping torque the value of which is substantially constant for a predetermined angular position of the screen wiper arm with respect to the drive head, together with torque adjusting means for automatically adjusting the value of the wiping torque as a function of the variation in the said angular position, characterised in that the said torque adjusting means comprise a cam, which is connected to the drive head or to the screen wiper arm, and a cam follower element which is connected to the screen wiper arm or to the drive head, and which is displaced along the cam as a function of the relative angular displacements between the screen wiper arm and the drive head, so as to apply to the screen wiper arm a complementary torque such as to cause the value of the wiping torque to vary.

Some preferred, but optional, features of the invention are as follows:

The cam may be connected to the drive head, the cam follower element being connected to the screen wiper arm through a transmission member which is adapted to be displaced with respect to the screen wiper arm against a resilient loading force.

The transmission member may be mounted pivotally on the screen wiper arm about a pivot axis which is parallel to the articulation axis, with the wiper including a resilient loading member which urges the transmission member in rotation about its pivot axis in the direction appropriate for maintaining the cam follower element in contact with the cam.

The transmission member may include a branch which extends in a direction at right angles to the pivot axis, with one of its ends carrying the said cam follower element.

The said end of the branch may include a roller which is mounted for rotation about an axis of rotation parallel to the pivot axis.

The resilient loading member may be a helical compression spring, a first end of which exerts a biasing force on the said branch, with its second end cooperating with an engagement surface defined in the screen wiper arm.

The transmission member may further include an arm, with the said spring acting on one end of the said arm.

The cam may be mounted for movement with respect to the drive head in a direction at right angles to the articulation axis, with cam adjusting means being provided for adjusting the position of the cam with respect to the said drive head.

The said cam adjusting means may be manual adjusting means.

The cam may be formed on a member which is connected to the end of the output member of a linear actuator, the body of which is associated with the drive head.

DESCRIPTION OF PREFERRED EMBODIMENTS OF THE INVENTION

Figure 1:
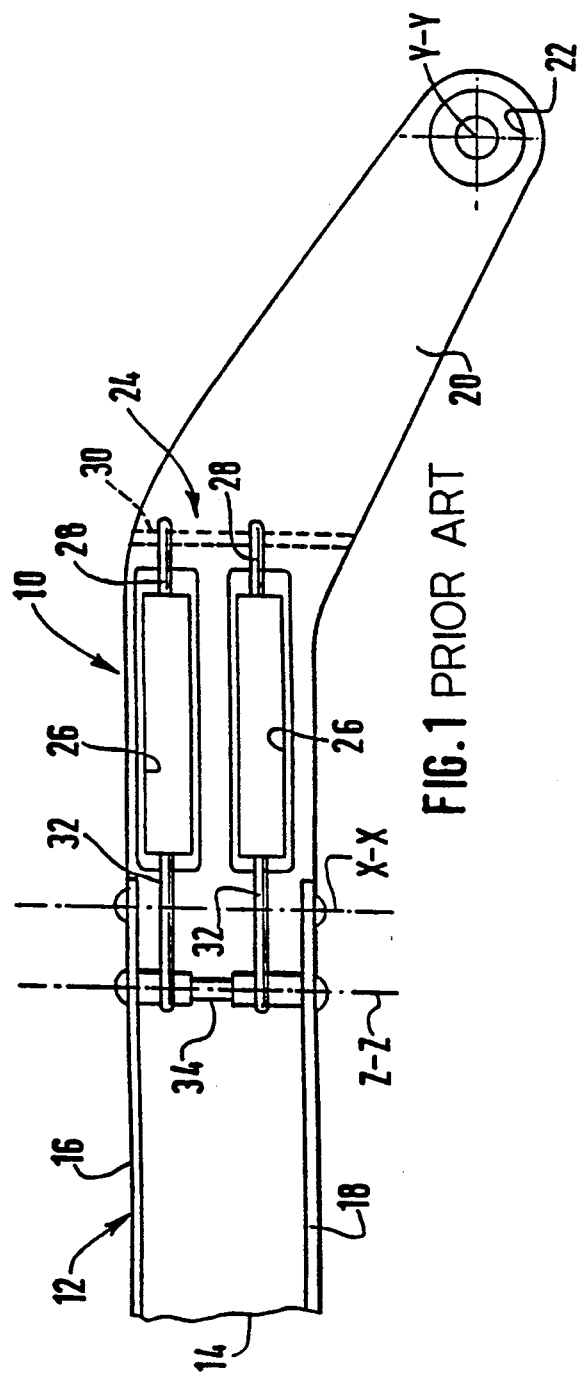
FIG. 1 is a top plan view, shown partly cut away, of a screen wiper in accordance with the prior art.
Figure 6:
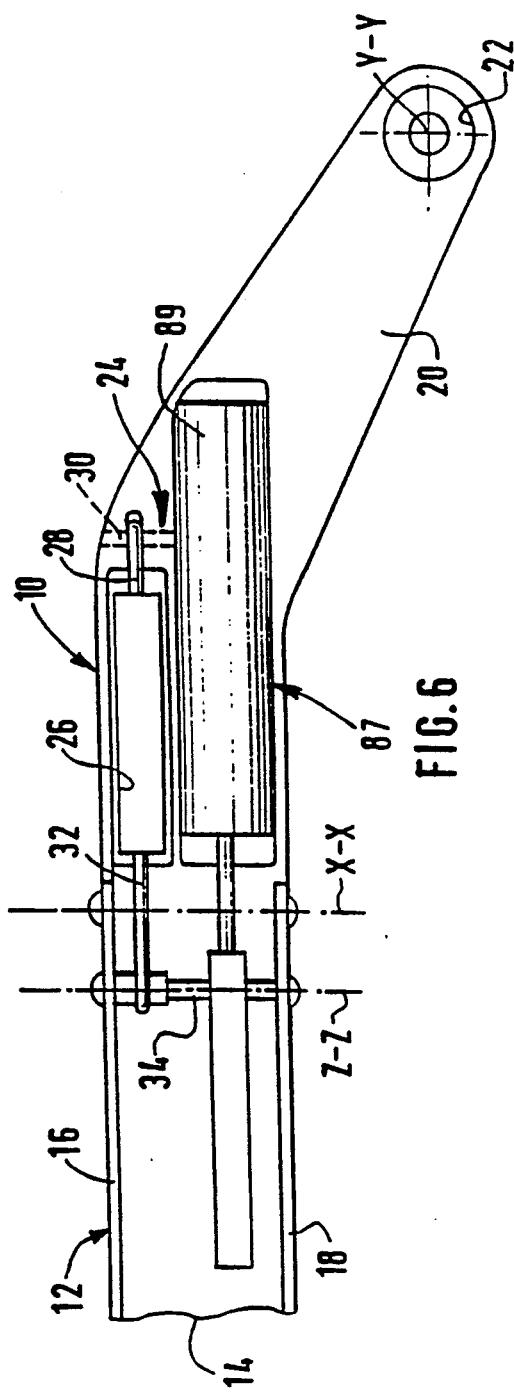
FIG. 6 is a view similar to FIG. 1, but shows a modified embodiment in which the screen wiper includes controlled means for causing the value of the wiping torque to vary generally.
Figure 2:
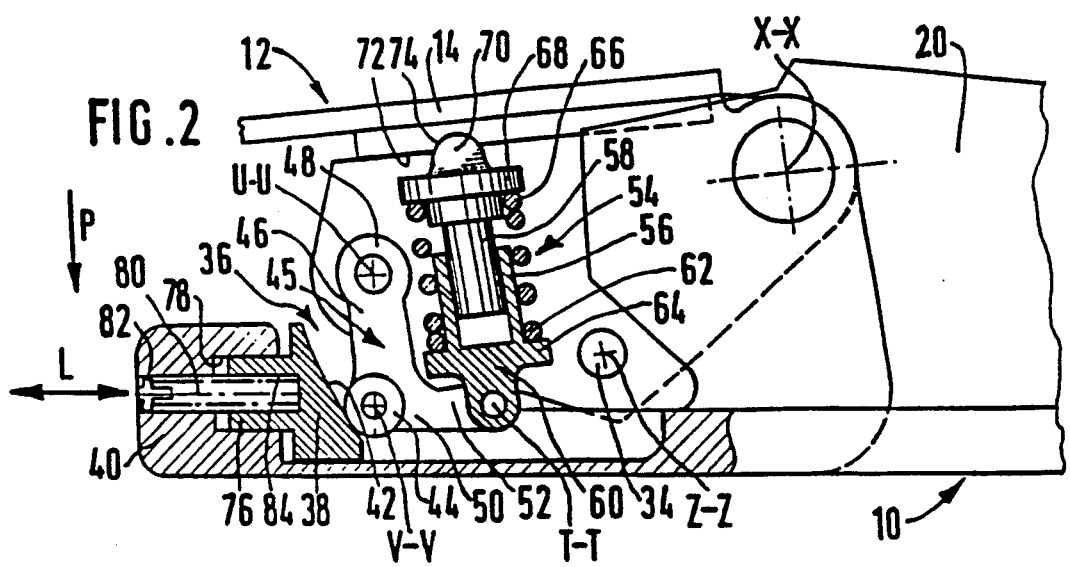
FIG. 2 is a somewhat diagrammatic view, shown in transverse cross section and on a larger scale, of part of the same screen wiper which is partly shown in FIG. 1, but which in accordance with the invention includes means for causing the value of the wiping torque to vary automatically.

The screen wiper 10 shown in FIGS. 1 and 2 includes a screen wiper arm 12 which also serves as a blade carrier. The portion of the arm 12 illustrated in the Figures is in the form of a hollow profiled member of U-shaped cross section, defining a back portion 14 and two side flanges 16 and 18 projecting at right angles to the back portion 14.

The wiper arm 12 is articulated on a drive head 20 about a geometric articulation axis X—X, which extends in a direction at right angles to the general longitudinal direction of the wiper arm 12. The drive head 20 includes, at its opposite end from the articulation axis X—X, a bore 22 defining a drive axis Y—Y which is substantially at right angles to the articulation axis. The bore 22 receives a wiper spindle (not shown), for driving the drive head 20 in alternating rotary movement. The drive spindle is itself driven by any suitable means, for example a conventional wiper motor (not shown).

In a known manner, the screen wiper 10 includes means 24 for applying a wiping force or pressure to the arm 12, the value of this force or pressure being substantially constant and its direction being towards the swept surface (which is not shown). As shown, the wiping pressure applying means 24 consists of a pair of helical tension springs 26, the first or inner ends 28 of which are hooked on to a transverse anchor bar 30 of the drive head. The second or outer ends 32 of the springs 26 are hooked over another transverse anchor bar 34, which is carried by the wiper arm 12.

This second anchor bar 34 has an axis Z—Z which lies below the articulation axis X—X, that is to say between the latter and the swept surface, so that the springs 26 apply a wiping torque to the wiper arm 12 about its articulation axis X—X. As a result, a wiping pressure P is applied to the wiping strip of the blade (not shown), which is of course carried at the end of the wiper arm 12 remote from the end defining the axis X—X.

In this known type of design, the nominal value of the wiping torque or wiping pressure P is substantially constant; in particular it hardly varies at all, regardless of the relative angular position of the wiper arm 12 with respect to the drive head 20.

Reference is now made to FIG. 2, which shows means 36 which enable the value of the wiping torque to be adjusted automatically as a function of the angular position of the wiper arm about the articulation axis X—X with respect to the drive head 20. These means 36 comprise a cam 38 which is connected to a free end portion 40 that forms an extension of the body of the drive head 20. The cam 38 has a cam profile 42 cooperating with a cam follower roller 44.

The automatic torque adjusting means 36 also include a transmission member which is in the form of a bell crank 45. The bell crank 45 has two branches 45 and 52. The branch 46 is pivoted through its first end 28 for pivoting movement with respect to the wiper arm 12, about a pivot axis U—U which is parallel to the articulation axis X—X. The second end 50 of the branch 46 carries the cam follower roller 44, which is mounted for free rotation about an axis of rotation V—V parallel to the pivot axis U—U. The other branch 52 is an arm which extends from the second end 50 of the first branch 46, in a direction which is substantially at right angles to that of the latter. Both of the branches 46 and 52 of the bell crank extend in a plane at right angles to the articulation axis X—X and pivot axis U—U.

The automatic torque adjusting means 36 further include a loading spring 54, which is here in the form of a helical compression spring. This spring 54 is carried by an assembly which consists of a cylinder 56 and a piston 58, the latter being mounted for sliding movement within the bore of the cylinder 56. The end portion 60 of the body of the cylinder 56 is mounted pivotally on the free end of the bell crank arm 52, about a pivot axis T—T which is parallel to the pivot axis U—U and axis of rotation V—V.

A first end 62 of the loading spring 54 bears on an external radial shoulder 64 of the body of the cylinder 56, while the second end 66 of the spring 54 bears on an external radial shoulder 68 of the body of the piston 58. The free end 70 of the body of the piston 58 bears against an abutment surface 72, which is formed in the back portion 14 (FIG. 1) of the wiper arm 12, through a ball type articulation 74. The loading spring 54 thus at all times biases the bell crank 45 in rotary movement about the axis U—U, in the clockwise direction as viewed in FIG. 2, so as to apply the cam follower roller 44 against the profile 42 of the cam 38.

As can readily be seen in FIG. 2, the cam 38 is mounted on the end portion 40 of the drive head 20, but can be displaced with respect to the latter in a direction L. To this end, an extension 76 of the cam 38 is received in sliding engagement in a guide recess 78 formed in the end portion 40.

A manual adjusting screw 80 is received in two threaded holes 82 and 84, which are formed in the end portion 40 and the extension portion 76 respectively, in such a way as to enable the position of the cam 38 to be adjusted in the direction L and with respect to the end portion 40, by simple rotation of the adjusting screw 80. The screw 80 this enables the position of the cam 38 to be adjusted manually with respect to the drive head 20, and thus with respect to the various components of the automatic torque adjusting means 36 associated with the screen wiper arm 12.

The operation of the automatic torque adjusting means 36 will now be described. In the course of the displacements of the wiper blade over the swept surface (for example the windshield of a motor vehicle), these displacements being shown diagrammatically in FIG. 4, the curved profile of the windshield causes the screen wiper arm 12 to undergo oscillating angular displacements about the articulation axis X—X with respect to the drive head 20. As a result, the cam follower roller 44 is displaced along the profile 42 of the cam 38, which is generally oriented substantially on a tangent to a circle which is centred about the articulation axis X—X.

Due to the relative displacements of the elements 12 and 20, the cam follower roller 44 undergoes a reaction force which is applied to it by the cam profile 42. The bell crank 45 transmits this force to the screen wiper arm 12, so that it is converted into a complementary torque having a value which changes according to the cam profile 42, and which adjusts itself, or reverts to the mean nominal value of the wiping torque applied to the wiper arm 12 by the helical tension springs 26.

Figure 3:
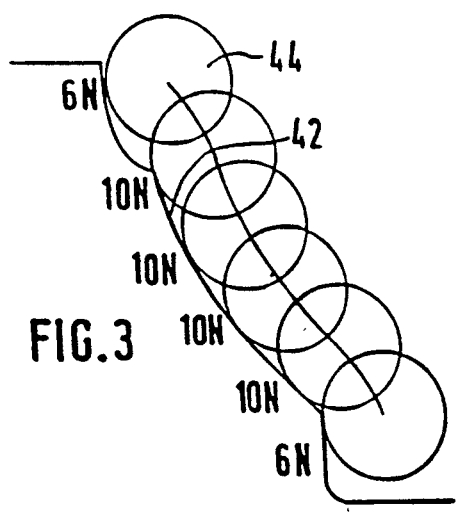
FIG. 3 is a diagrammatic view on a larger scale still, showing a first example of the cam profile in the wiper shown in FIG. 2.
Figure 4:
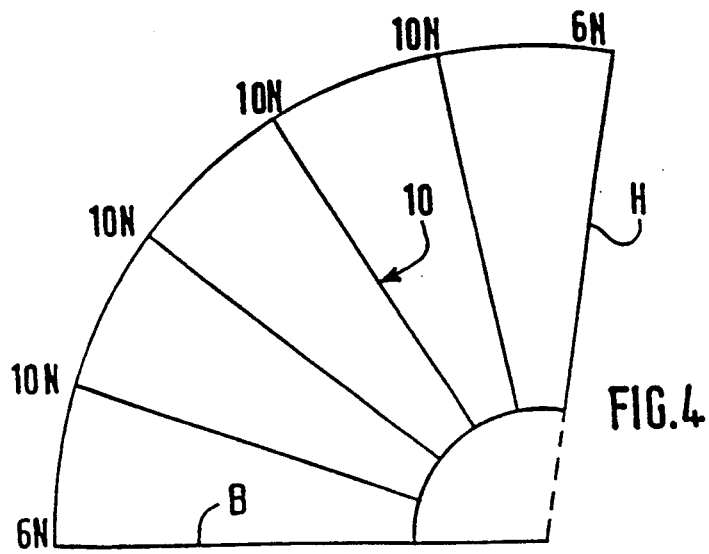
FIG. 4 is a diagram showing the value of the wiping torque at different positions of the wiper arm in respect of the swept surface during a wiping cycle, when the cam which is employed is one having the profile shown in FIG. 3.
Figure 7:
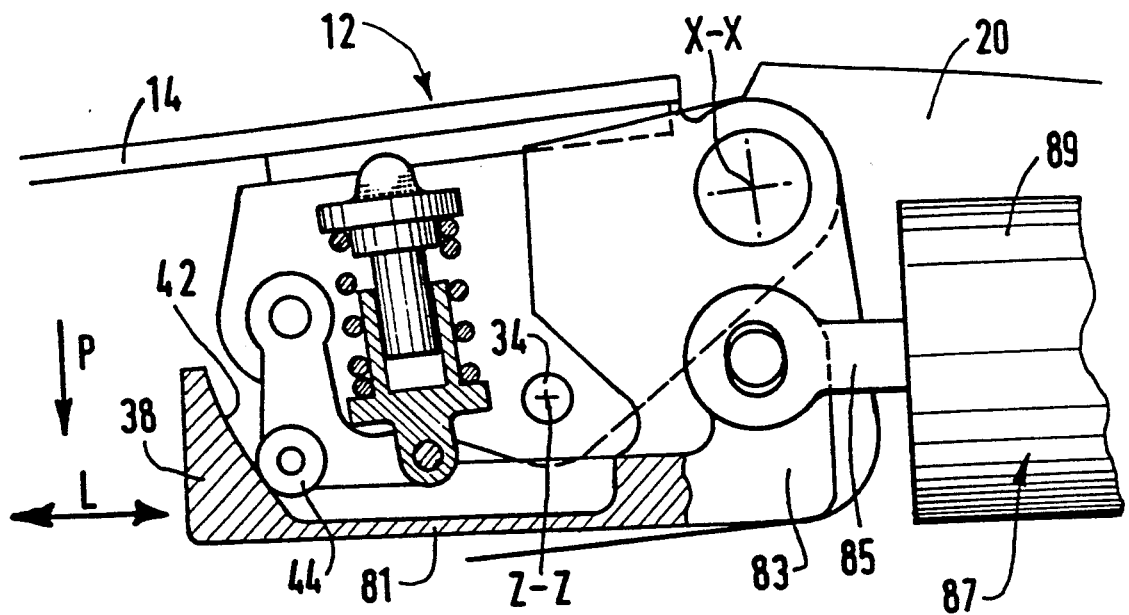
FIG. 7 is a view similar to FIG. 2, showing one embodiment of the invention in association with a screen wiper of the same kind as is shown in FIG. 6.

Reference will now be made to FIGS. 3 and 4, which show one suitable form of the cam profile 42, along which are indicated the values of the wiping pressure P expressed in Newtons, as a function of the relative position of the cam follower roller 44 along the cam profile 42.

Starting from the bottom position B, it is found that the value of the wiping pressure V varies from a minimum of 6 Newtons from which it increases up to a value of 10 Newtons, at which value it is substantially constant during the main part of the travel of the wiper, due to the substantially circular profile of the central portion of the cam 38. The value of the wiping pressure then falls once again to the reduced value of 6 Newtons in the upper position H of the screen wiper blade.

Figure 5:
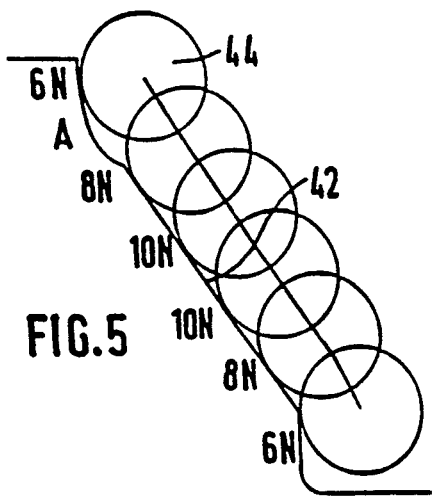
FIG. 5 is a view similar to that in FIG. 3, but shows another form of the cam profile.

In the modified version shown in FIG. 5, the central portion of the cam profile 42 is substantially rectilinear, which causes a progressive increase to occur in the value of the wiping pressure, followed by a progressive reduction over the central part of the wiping cycle.

The loading spring 54 is designed so that its elastic constant applies to the bell crank 45 a reaction torque having a predetermined value, which urges it in the clockwise direction with respect to FIG. 5 about the axis U—U. The value of the elastic constant of the spring 54 is so chosen that the reaction torque is slightly greater than the reaction torque which is applied to the bell crank by the cam follower roller 44, so that the bell crank 45 is able to apply a complementary torque to the screen wiper arm 12.

Reference will now be made to FIGS. 6 to 9, showing another embodiment. In this embodiment, the cam 38 is formed on the end of a member 81 which is guided in sliding movement in the direction L in the drive head 20. One end 83 of the member 81 is connected to the free end 85 of the ram of a linear actuator 87, the body 89 of which is secured on the drive head 20.

The actuator 86 replaces the manual adjusting means shown in FIG. 2 for adjusting the position of the cam 38 with respect to the drive head 20. In this example the cam position, and in consequence the nominal value of the wiping torque, is varied by the actuator 86 as a function of appropriate control parameters. These latter are for example representative of operating parameters of the vehicle such as its travelling speed.

Figure 8:
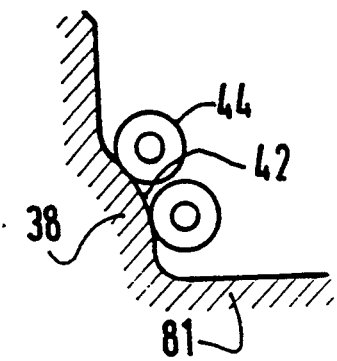
FIG. 8 is a view similar to FIG. 3, but showing one particular form of the cam profile shown in FIG. 7.
Figure 9:
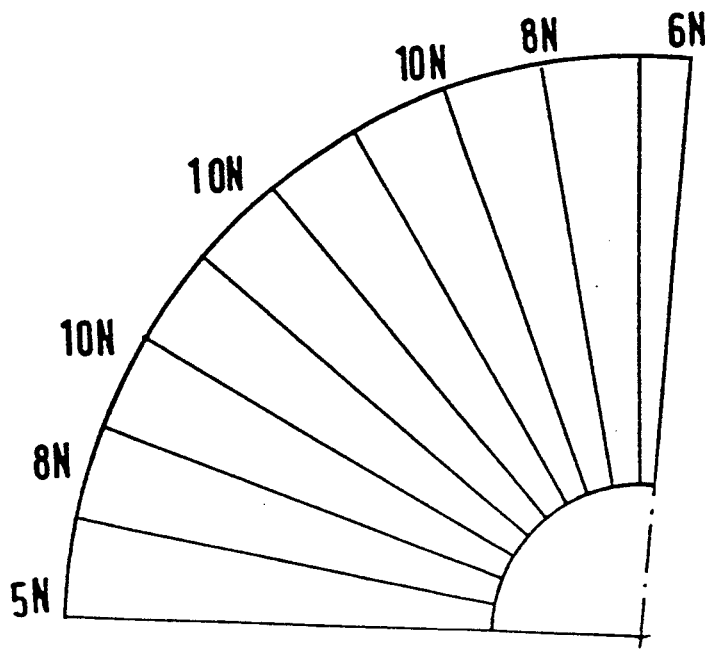
FIG. 9 is a view corresponding to FIG. 4 but for the embodiment shown in FIG. 8.

The profile 42 of the cam 38 shown in FIG. 8 is so designed as to give an increase in the wiping pressure as a function of the position of the screen wiper blade on the windshield. It is thus possible to obtain a pressure of 6 Newtons in the parked position, followed by a progressive increase from 6 to 10 Newtons and then a reduction from 10 to 6 Newtons during the back and forth wiping movement, with a pressure of 6 Newtons in the top position so as to facilitate the return stroke.

What is claimed is:

1. A screen wiper that has a wiper blade for wiping a screen, said screen wiper comprising: a wiper arm carrying the wiper blade; a drive head; articulating means defining an articulation axis and articulating said wiper arm and the wiper blade on the drive head about said axis; torque applying means coupled between and to said drive head and said wiper arm with the wiper blade for applying a wiping torque to said wiper arm and the wiper blade, said torque applying means including at least one spring for applying to said wiper arm and the wiper blade a wiping torque having a value which is substantially constant for a pre-determined angular position of said wiper arm with respect to said drive head; and torque adjusting means coupled between and to said drive head and said wiper arm for automatically adjusting the value of said wiping torque as a function of variation in said angular position, said torque adjusting means having a cam connected to said drive head and a cam follower element connected to said wiper arm and cooperating with said cam, such that said follower is displaced along said cam as a function of relative angular displacements between said wiper arm and said drive head, so as to apply a complementary torque to said wiper arm such as to vary the value of said wiping torque, said screen wiper further including a transmission member connecting said cam follower element to said wiper arm, and loading means for applying a resilient loading force to said transmission member such that said transmission member can be displaced with respect to said wiper arm against said loading force, and means defining a pivot axis parallel to said articulation axis and mounting said transmission member on said wiper arm for pivoting movement about said pivot axis, said loading means having a resilient loading member urging said transmission member into rotation about said pivot axis in a direction to maintain said cam follower element in contact with said cam.

2. A screen wiper according to claim 1, wherein said transmission member comprises a branch extending in a direction at right angles to said pivot axis and having an end, said cam follower element being carried by said end.

3. A screen wiper according to claim 2, wherein said branch end defines an axis of rotation parallel to said pivot axis, said cam follower element being a roller carried by said branch for rotation about said axis of rotation.

4. A screen wiper according to claim 2, wherein said resilient loading member is a helical compression spring having a first end and a second end, said screen wiper defining an engagement surface, with said first end of said compression spring exerting a biasing force on said branch of said transmission member, and with its second end cooperating with said engagement surface.

5. A screen wiper according to claim 4, wherein said transmission member further comprises an arm extending from said branch and having a free end, with said loading spring acting on this end.

6. A screen wiper according to claim 1, including means defining a direction at right angles to said articulation axis and mounting said cam for movement with respect to said drive head in said direction, and cam adjusting means for adjusting the position of said cam with respect to said drive head.

7. A screen wiper according to claim 6, wherein said cam adjusting means are manual.

8. A screen wiper according to claim 6, further including a linear actuator comprising a body and an output member cooperating with said body and having a free end, said body being associated with said drive head, said wiper further including a member defining the cam and connected to the free end of the output member of said actuator.

* * * * *